March 30, 1954   M. TEN BOSCH ET AL   2,673,683
TIME OF FALL COMPUTER
Filed Feb. 1, 1950
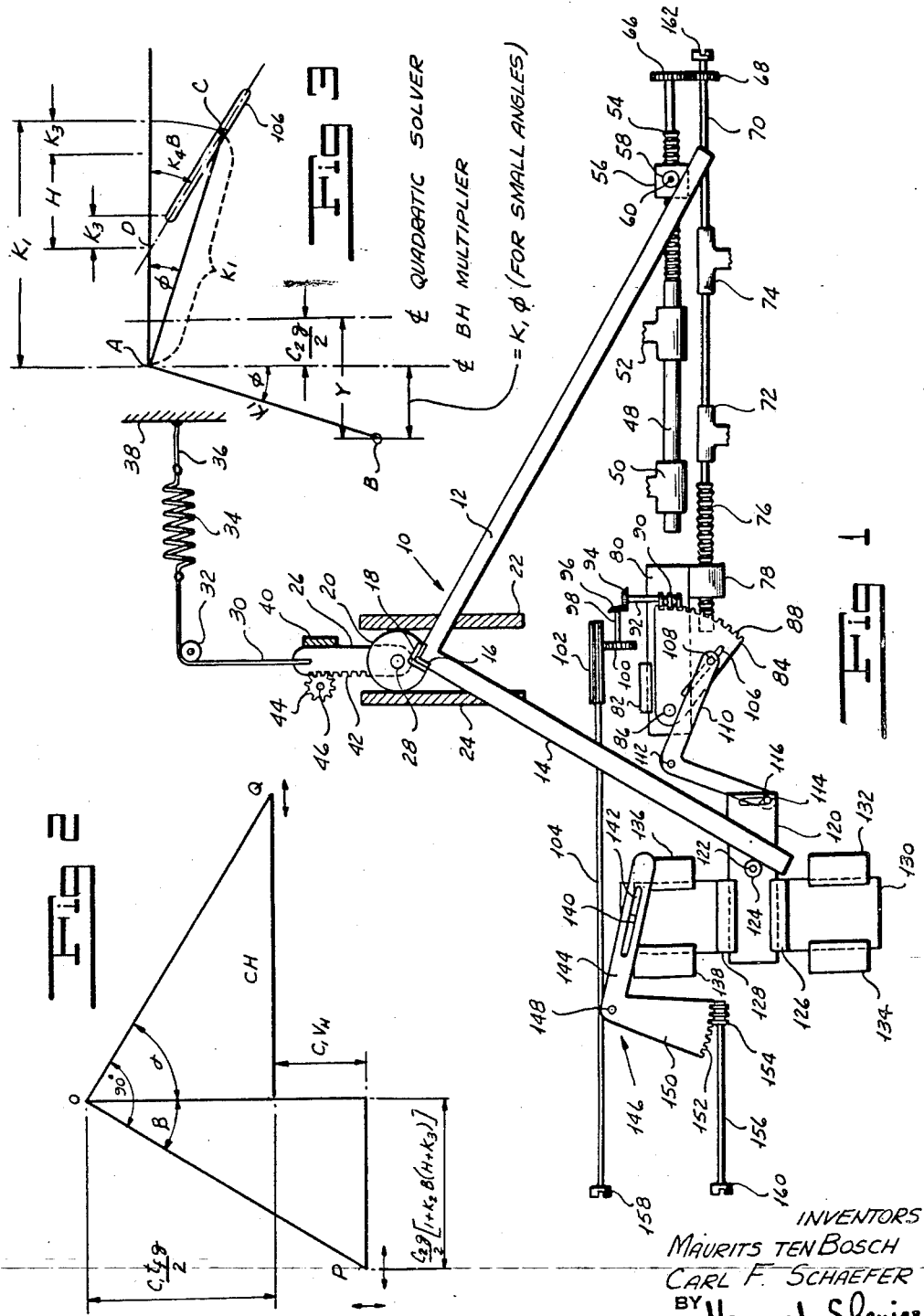
INVENTORS
MAURITS TEN BOSCH
CARL F. SCHAEFER
BY Henry L. Shenier
ATTORNEY Patented Mar. 30, 1954

2,673,683

UNITED STATES PATENT OFFICE 2,673,683

TIME OF FALL COMPUTER

Maurits ten Bosch, White Plains, and Carl F. Schaefer, Port Washington, N. Y., assignors to The Norden Laboratories Corporation, White Plains, N. Y., a corporation of Connecticut Application February 1, 1950, Serial No. 141,796

5 Claims. (Cl. 235—61.5)

Our invention relates to a time of fall computer and more particularly to a device for computing the time of fall of a bomb, torpedo, mine or other missile dropped from an aircraft.

Heretofore bombardiers found it necessary to compute the time of fall from a ballistic table having a large number of entries. Inasmuch as the ascertaining of the time of fall from the ballistic table took a period of time, it was necessary to enter the table with a predetermined altitude of release and to set the bombsight for the time of fall given by the ballistic table, taking into consideration the variable factors with the predetermined altitude as one of the arguments. If the bomb was not released at the predetermined altitude an error was introduced. Very frequently the necessity of avoiding antiaircraft fire rendered it inadvisable to approach a target at the predetermined altitude. Under the stress of action continuous errors are apt to be introduced in picking the time of fall from a ballistic table. The ballistic table has a large number of entries and the variation of the time of fall with respect to altitude would introduce a major error into the time of fall.

We have discovered that it is an empirical fact that the ratio represented by $$\frac{bomb\ trail}{air\ speed \times altitude}$$

varies very slowly and that this ratio can be used together with altitude and vertical speed to compute time of fall. A variation of one hundred feet in altitude in this ratio has a negligible effect on the time of fall as compared with the variation of one hundred feet in the ballistic tables. The bomb trail is the distance measured on a horizontal line at ground level between the point of impact of the bomb and a point directly below the aircraft at the moment of impact.

One object of our invention is to provide a time of fall computer using as the ballistic the ratio $$\frac{bomb\ trail}{air\ speed \times altitude}$$

Another object of our invention is to provide a time of fall computer in which time of fall is instantly given from settings representing altitude, ballistic and vertical velocity of the aircraft at the time of drop.

Another object of our invention is to provide a time of fall computer which is simple in construction, sure and easy of operation and which will continuously compute time of fall.

Other and further objects of our invention will appear from the following description.

In the accompanying drawings which form part of the instant specification and which are to be read in conjunction therewith:

Figure 1 is a diagrammatic view showing a time of fall computer according to one embodiment of our invention.

Figure 2 is a diagram showing the principle of operation of the quadratic solver forming part of our time of fall computer.

Figure 3 is a diagram showing the principle of operation of the ballistic altitude multiplier forming part of our time of fall computer.

Referring now to Figure 1, a right angle member indicated generally by the reference numeral 10 is provided with a pair of arms 12 and 14 extending at right angles to one another. The member 10 is provided with a flange 16 which is secured to a flange 18 formed integrally with a cylindrical member 20 which is positioned between a pair of vertical guide members 22 and 24 such that the member 20 may move vertically upwardly and downwardly and rotate between guide members 22 and 24, carrying the right angle member 10 with it. A rack 26 is pivoted by bearing 28 to the cylindrical member 20 and is adapted to move with the cylindrical member. A flexible member 30 is secured at one end to the upper end of the rack 26 and passes over a pulley 32 so that its other end may be fastened to the end of a spring 34. The other end of spring 34 is secured by member 36 to a stationary part of the apparatus 38. The arrangement is such that the rack 26 will be biased by the spring 34 to move upwardly. A guide member 40 is positioned at one side of the rack 26. The rack teeth 42 mesh with a pinion 44 secured to a shaft 46. The arrangement is such that the pinion will prevent the rack 26 from moving to the left maintaining it against the guide member 40 so that the rack is adapted to move only in a vertical direction to rotate the pinion 44. The rotation of the pinion will be a function of the desired time of fall, the output of the computer being taken from the rotation of this pinion.

A horizontal shaft 48 is positioned to rotate in a pair of bearings 50 and 52 and is provided with screw threads 54 upon which is threadedly mounted an internally threaded block 56. A roller 58 adapted to rotate around a bearing 60 is carried by the block 56. The end of the shaft 48 carries a gear 66 which meshes with a gear 68 secured to a shaft 70 which is rotatably carried in a pair of bearings 72 and 74. The end of shaft 70 is formed with a threaded member 76 which engages an internally threaded yoke 78 formed integral with a block 80. This block is positioned in a carrier 82 for movement along a horizontal direction only. The lower end of the arm 12 of the right angle member 10 engages the roller 58 and is adapted to be positioned by it. A gear segment 84 is pivoted to the reciprocating block 80 around pivot pin 86 carried by the block. The gear segment 84 is provided with gear teeth 88 which mesh with a worm 90 carried by a shaft 92 to which is secured a bevel gear 94 meshing with a bevel gear 96 carried by a shaft 98. The end of shaft 98 carries a gear 100 which meshes with a pinion 102 formed with elongated teeth. The assembly comprising shafts 98 and 92 and their associated gears and worm is supported from and adapted to move with the block 80. The gear 102 is provided with elongated teeth so that the gear 100 will continue to mesh therewith during the relative movement between the gear 100 and the pinion 102. A shaft 104 is adapted to rotate the pinion 102. The gear segment 84 is provided with a slot 106 in which is seated a pin 108 secured to the end of a right angle bell crank 110 pivoted about pivot pin 112. The other end of bell crank 110 carries a pin 114 lodged in a slot 116 formed in block 120. The block 120 carries a pin 122 around which a roller 124 is adapted to rotate. This roller 124 contacts the other arm 14 of the right angle member 10. The block 120 is positioned for reciprocation in a horizontal direction in a pair of guide members 126 and 128 carried by a vertically movable carrier 130 which is constrained to move in a vertical direction by a lower pair of guide members 132 and 134 and an upper pair of guide members 136 and 138. Movement of the carrier 130 in a vertical direction will move the block 120 with it and hence the roller 124. Movement of the block 120 in a horizontal direction will likewise move the roller. A pin 140 is carried by the upper portion of the carrier 130 and is positioned within a slot 142 formed in one arm 144 of a bell crank indicated generally by the reference numeral 146 and pivoted about pivot pin 148. The other arm 150 of the bell crank is provided with gear teeth 152 meshing with a worm 154 carried by a shaft 156. The shaft 104 is adapted to be rotated as a function of the ballistic, that is, as a function of $$\frac{\text{trail}}{\text{air speed} \times \text{altitude}}$$

through connection 158 which may be attached to a ballistic computer (not shown). The shaft 156 is adapted to be rotated through connection 160 as a function of vertical velocity through a suitable computer (not shown). The shaft 70 is adapted to be rotated as a function of altitude through connection 162 through a suitable computer (not shown). These functions may be set in by hand if desired.

In the consideration of Figures 2 and 3 certain symbols will be used, namely:

C is a proportionality constant,
$C_1$ is a proportionality constant,
$C_2$ is a proportionality constant,
$K_1$ is a constant,
$K_2$ is a constant,
$K_3$ is a constant,
$K_4$ is a constant,
B is the ballistic equalling $$\frac{\text{trail}}{\text{air speed} \times \text{altitude}}$$

$V_H$ is the initial vertical velocity of the aircraft from which the missile is being dropped, H is the altitude of the aircraft above the ground,
$g$ is the acceleration of gravity,
$t_f$ is the time of fall which is the desired quantity to be obtained by our time of fall computer.

The proportionality constant $C_1$ is chosen so that $$CC_2 = C_1^2$$

Referring now to Figure 2, the line OQ represents the length of the arm 12 from the apex of the right angle to the point of tangency of the roller 58. The line OP represents the length of arm 14 from the apex of the right angle to the point of tangency of the roller 124. As will be demonstrated hereinafter, the horizontal distance from the point P to the point directly below the apex of the right angle, that is, the distance from the point P to the center line of the quadratic solver, may be represented by the expression $$\frac{C_2 g}{2}[1 + K_2 B(H + K_3)]$$

The horizontal distance from point Q to the center line of the quadratic solver may be represented by CH. The vertical distance between point Q and point P may be represented by $C_1 V_H$. It will be observed that the roller 58 in Figure 1 which determines the position of point Q in Figure 2 is determined as a function of H since the gear 68 which is rotated from shaft 70 through the member 162 meshes with gear 66 which carries the screw 54. The roller 58 is carried by the block 56 which moves in a horizontal direction along the axis of the screw 54 as a function of H. It will be observed, too, that the vertical distance between a horizontal line through Q and a horizontal line through P is determined by the position of the roller 124. This is moved in a vertical direction through shaft 156 which is rotated as the function of $V_H$. The rotation of the shaft 156 will rock the bell crank 146 and move the block 130 in a vertical direction carrying the roller 124 in a vertical direction through a distance agreeable to $V_H$. The vertical distance along the center line through O from the horizontal line through Q to the apex of the right angle may be designated as $$\frac{C_1 t_f g}{2}$$

In Figure 2 the right angle is divided into two angles by the vertical center line through O. The angle formed by the center line with the arm OP may be designated as $\beta$. The angle formed by the center line with the arm OQ may be designated as $\alpha$. Since the angle POQ is a right angle (1) $$\tan \alpha = \cot \beta$$

(2) $$\tan \alpha = \frac{CH}{\frac{C_1 t_f g}{2}}$$

(3) $$\cot \beta = \frac{C_1 V_H + \frac{C_1 t_f g}{2}}{\frac{C_2 g}{2}[1 + K_2 B(H + K_3)]}$$

Substituting the values given in Equations 2 and 3 in Equation 1 we obtain (4) $$\frac{CH}{\frac{C_1 t_f g}{2}} = \frac{C_1 V_H + \frac{C_1 t_f g}{2}}{\frac{C_2 g}{2}[1 + K_2 B(H + K_3)]}$$

Cross multiplying in Equation 4 we obtain (5)
$$(CH)\left(\frac{C_2g}{2}[1+K_2B(H+K_3)]\right)= \left(\frac{C_1t_fg}{2}\right)\left(C_1V_H+\frac{C_1t_fg}{2}\right)$$

Rewriting we obtain (6)
$$(CH)\left(\frac{C_2g}{2}[1+K_2B(H+K_3)]\right)= \left(\frac{C_1t_fg}{2}\right)\left(\frac{C_1t_fg}{2}\right)+\left(\frac{C_1t_fg}{2}\right)(C_1V_H)$$

We have seen that $CC_2=C_1^2$. Substituting this value in Equation 6 and collecting terms we obtain the following equation (7) $\quad \frac{t_f^2g}{2}+t_fV_H-H[1+K_2B(H+K_3)]=0$ Solving Equation 7 we obtain (8) $\quad t_f=\frac{\sqrt{V_H^2+2gH[1+K_2B(H+K_3)]}}{g}-V_H$ Since $C_1$ is a constant and $g$ is a constant it will be observed that the vertical distance along the vertical center line from O to a horizontal line through Q will represent the desired function $t_f$.

It will be observed that the horizontal distance from P to the vertical center line through O is represented by the expression $$\frac{C_2g}{2}[1+K_2B(H+K_3)]$$

Let this expression equal Y and let us now refer to Figure 3. The point A represents the axis of the pivot pin 112 of the bell crank 110. The point B represents the axis of the pin 114 carried by one bell crank arm. The point C represents the axis of the pin 108 carried by the other bell crank arm which is lodged within the slot 106. The length of the bell crank arms are equal and are represented by the constant $K_1$. Let the angle between the upper bell crank arm and the horizontal line through A be $\phi$. Since the bell crank is a right angle, the angle between the vertical line through A and the other bell crank arm will likewise be $\phi$. The point D represents the axis of the pivot pin 86 around which the segment 84 rotates. Since the segment 84 is carried by the block 80 which moves in a horizontal direction as a function of altitude, the horizontal displacement between point D and a vertical line through the center of the slot 106 represents H. The distance between D and C when H equals zero is represented by $K_3$. The center line of the BH multiplier, that is the vertical line drawn through the axis of pivot pin 112 is displaced from the center line of the quadratic solver, that is the center line through the apex of the right angle member 10 by a distance equal to $$\frac{C_2g}{2}$$

The angle between the horizontal line through A and the axis of the slot 106 is represented by $K_4B$. It will be observed that this angle is changed as a function of B through the rotation of shaft 104 so that this angle will always be a function of B.

The following relations appear:

(9) $\quad \tan K_4B=\frac{K_1\sin\phi}{K_1\cos\phi-[K_1-(A+K_3)]}$ for small angles

(10) $\quad K_4B=\frac{K_1\phi}{H+K_3}$ or, rewriting,

(11) $\quad K_1\phi=K_4B(H+K_3)$

We choose the constant $K_4$ to have a value equal to $$\frac{C_2gK_2}{2}$$

Substituting this value for $K_4$ in Equation 11 we obtain

(12) $\quad K_1\phi=\frac{C_2gK_2B(H+K_3)}{2}$

Now, from Figure 2 we see

(13) $\quad Y=\frac{C_2g}{2}+K_1\phi$ or, substituting value of $K_1\phi$ in 12 in Equation 13 we obtain

(14) $\quad Y=\frac{C_2g}{2}[1+K_2B(H+K_3)]$

The ballistic may be set manually for the approximate altitude and air speed at the time of drop or may be computed by cams as a function of air speed, altitude and type of bomb (which gives trail) in a computer (not shown), and this may be fed through connection 158 to determine the angle at which the slot 106 is positioned with respect to the horizontal. The altitude may be measured from an integrating altimeter and fed automatically to member 162 to rotate shafts 70 and 48. The rotation of shaft 70 will position the block 80 and hence the pivot pin 85 along a horizontal line as a function of altitude. The rotation of shaft 48 will position the roller 58 as a function of altitude. The product of altitude and ballistic will determine the horizontal distance between the point P and the vertical center line through the apex of the right angle member 10 by means of the pin 114 and the horizontally sliding block 120. The block is moved in a vertical direction as a function of $V_H$ through the bell crank 146 which is controlled by shaft 156 and the pin 140 and its coacting slot 142. The coaction of the movement of the block 120 in a horizontal direction through the BH multiplier and in a vertical direction through the $V_H$ function will position the roller 124 and determine the position of point P. The position of both points P and Q being determined in this manner will automatically position the apex of the right angle member 10 to represent the desired function $t_f$.

It will be seen that we have accomplished the objects of our invention. We have provided a time of fall computer in which bomb trail divided by the product of air speed and altitude is used as the ballistic. We have provided a time of fall computer in which the time of fall is instantly given from settings representing altitude, ballistic and vertical velocity of the aircraft at the time of drop. Our computer is simple in construction, sure and easy of operation and will continuously compute time of fall if the arguments of altitude, ballistic and vertical velocity are continuously fed into the computer. Our time of fall computer is simple and inexpensive to construct and may be manufactured to give high precision in the computation of the desired variable.

It will be understood that certain features and subcombinations are of utility and may be employed without reference of other features and subcombinations. This is contemplated by and is within the scope of our claims. It is further obvious that various changes may be made in details within the scope of our claims without departing from the spirit of our invention. It is therefore to be understood that our invention is not to be limited to the specific details shown and described.

Having thus described our invention, what we claim is:

1. A time of fall computer for indicating the time of fall of a projectile dropped from an aircraft to the surface of the earth including in combination a bell crank having a pair of arms extending at right angles to each other, a pivot for rotating the bell crank around a point adjacent the intersection of said arms, guide means for said pivot constraining it to move along a predetermined straight line, a first positioning means adjacent one of said arms, a second positioning means adjacent the other of said arms, biasing means to bring said arms into engagement with said positioning means, means for moving said first positioning means along a locus at right angles to said straight line as a function of the altitude of the aircraft, means for moving the other of said positioning means along a locus at right angles to said straight line as a function of a ballistic correction, means for displacing said last named locus as a function of the vertical velocity of the aircraft and means responsive to the movement of said pivot along the guide means for indicating the desired time of fall.

2. A time of fall computer for indicating the time of fall of a projectile dropped from an aircraft to the surface of the earth including in combination a bell crank having a pair of arms extending at right angles to each other, a pivot for rotating the bell crank around a point adjacent the intersection of said arms, guide means for said pivot constraining it to move along a predetermined straight line, a first positioning means adjacent one of said arms, a second positioning means adjacent the other of said arms, biasing means to bring said arms into engagement with said positioning means, means for moving said first positioning means along a locus at right angles to said straight line as a function of the altitude of the aircraft, means for multiplying a ballistic correction by altitude, means for introducing a ballistic correction to the multiplier, means for introducing altitude to the multiplier, means for moving the other of said positioning means along a locus at right angles to said straight line as a function of the output of said multiplying means, and means responsive to the movement of said pivot along the guide means for indicating the desired time of fall.

3. A time of fall computer for indicating the time of fall of a projectile dropped from an aircraft to the surface of the earth including in combination a bell crank having a pair of arms extending at right angles to each other, a pivot for rotating the bell crank around a point adjacent the intersection of said arms, guide means for said pivot constraining it to move along a predetermined straight line, a first positioning means adjacent one of said arms, a second positioning means adjacent the other of said arms, biasing means to bring said arms into engagement with said positioning means, means for moving said first positioning means along a locus at right angles to said straight line as a function of the altitude of the aircraft, means for multiplying a ballistic correction by altitude, means for introducing a ballistic correction to the multiplier, means for introducing altitude to the multiplier, means for moving the other of said positioning means along a locus at right angles to said straight line as a function of the output of said multiplying means, means for displacing said second positioning means along a locus parallel to said straight line as a function of the vertical velocity of said aircraft, and means responsive to the movement of said pivot along the guide means for indicating the desired time of fall.

4. A time of fall computer as in claim 2 in which said means for multiplying a ballistic correction by the altitude comprises a carriage, means for mounting said carriage for movement along a locus at right angles to said straight line, means for moving said carriage as a function of the altitude of the aircraft, a gear segment, means for pivotally mounting said gear segment on said carriage for movement therewith, a bell crank having a pair of arms extending at right angles to each other, inter-engaging means for coupling one of said arms with said gear segment, means coupling the other of said arms with said second positioning means, and means for rotating said gear segment as a function of the ballistic correction.

5. A time of fall computer as in claim 3 in which said means for displacing said second positioning means along a locus parallel to said straight line comprises a carriage, means for mounting said carriage for movement along a locus parallel to said straight line, a member positioned in said carriage for movement therewith and slidable therein in a direction at right angles to the direction of movement of said carriage, said second positioning means being mounted on said member, and means responsive to the vertical velocity of the aircraft for moving said carriage.

MAURITS TEN BOSCH.
CARL F. SCHAEFER.

References Cited in the file of this patent
UNITED STATES PATENTS

| Number | Name | Date |
|---|---|---|
| 1,963,907 | Julius | June 19, 1934 |
| 2,113,199 | Raaber | Apr. 5, 1938 |
| 2,210,938 | Garrett | Aug. 13, 1940 |
| 2,220,399 | Fagerholm | Nov. 5, 1940 |
| 2,506,876 | Julius | May 9, 1950 |